(12) United States Patent
Reyes

(10) Patent No.: US 7,575,067 B1
(45) Date of Patent: Aug. 18, 2009

(54) SCRAPER SYSTEM

(76) Inventor: Harvey A. Reyes, 13591 Gaines Cir., Garden Grove, CA (US) 92843

( * ) Notice: Subject to any disclaimer, the term of this patent is extended or adjusted under 35 U.S.C. 154(b) by 83 days.

(21) Appl. No.: 11/751,921

(22) Filed: May 22, 2007

(51) Int. Cl.
*A01B 31/00* (2006.01)

(52) U.S. Cl. ............... 172/684.5; 172/445.1; 172/667; 172/446

(58) Field of Classification Search .......... 172/684.5, 172/799.5, 445.1, 793, 654, 667, 779, 780, 172/781, 789, 324, 507, 605, 677, 678, 449, 172/446, 445.2
See application file for complete search history.

(56) References Cited

U.S. PATENT DOCUMENTS

| | | | | | |
|---|---|---|---|---|---|
| 3,034,238 | A | * | 5/1962 | McGee | ............... 172/777 |
| 3,058,243 | A | | 10/1962 | McGee | |
| 3,430,703 | A | * | 3/1969 | Richey | ............... 172/136 |
| 3,820,609 | A | * | 6/1974 | Trott | ............... 172/445.2 |
| 4,044,843 | A | * | 8/1977 | Holub | ............... 172/825 |
| D245,695 | S | | 9/1977 | Watts | |
| 4,113,031 | A | * | 9/1978 | Venable | ............... 172/667 |
| 4,239,085 | A | * | 12/1980 | Venable et al. | ............... 172/667 |
| 4,678,365 | A | * | 7/1987 | Ban et al. | ............... 404/118 |
| 4,779,363 | A | | 10/1988 | Boutrais et al. | |
| 4,821,810 | A | * | 4/1989 | Buchanan | ............... 172/197 |
| 5,564,885 | A | | 10/1996 | Staben, Jr. | |
| 5,911,279 | A | | 6/1999 | Whitener | |
| 6,308,785 | B1 | * | 10/2001 | Rhoden | ............... 172/393 |
| 6,546,650 | B1 | | 4/2003 | Meurer | |
| 7,100,314 | B1 | * | 9/2006 | Jensen | ............... 37/281 |

* cited by examiner

*Primary Examiner*—Robert E Pezzuto
*Assistant Examiner*—Matthew D Troutman

(57) ABSTRACT

A scraper system for scraping and ripping a support surface includes a frame being pulled behind the vehicle. The frame includes an adjustment beam slidably mounted to a front beam. A pair of mounting ends of the adjustment beam extends from opposing ends of the front beam. The frame includes a pair of side walls. Each of the mounting ends of the adjustment beam has one of the side walls coupled thereto. The adjustment beam is slid with respect to the front beam to adjust a lateral positioning of the side walls with respect to the front beam. A scraper assembly is coupled to and extends downwardly from the frame. The scraper assembly scrapes the support surface to smooth out the support surface. The scraper assembly is coupled to and extends between the side walls of the frame.

17 Claims, 10 Drawing Sheets

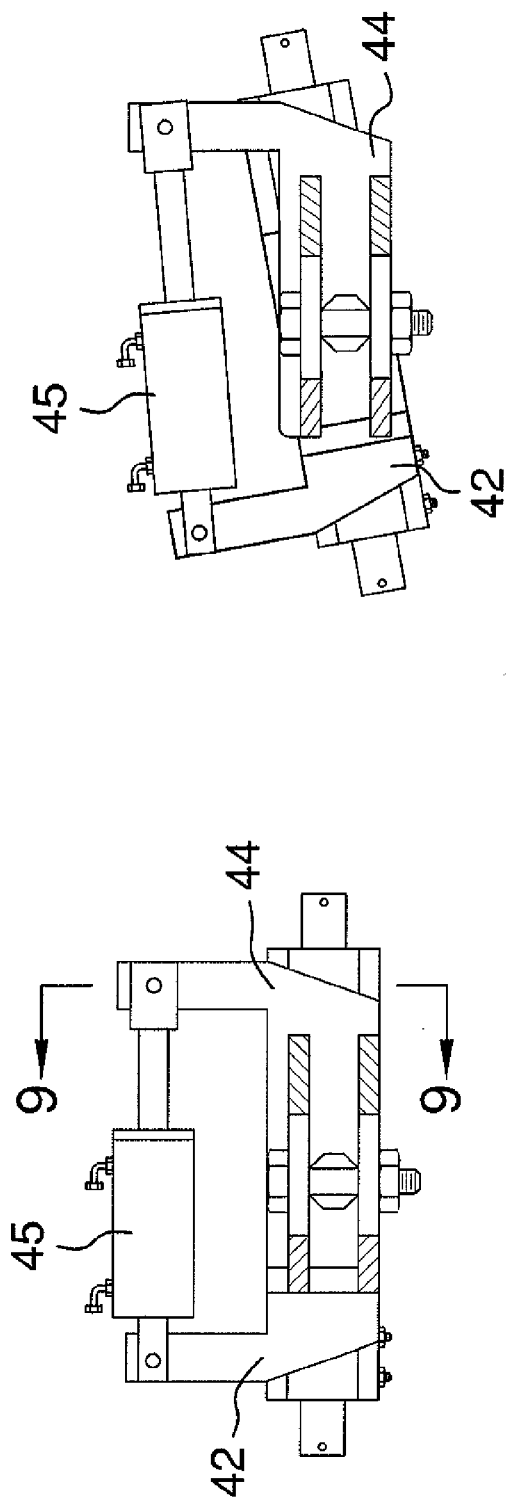
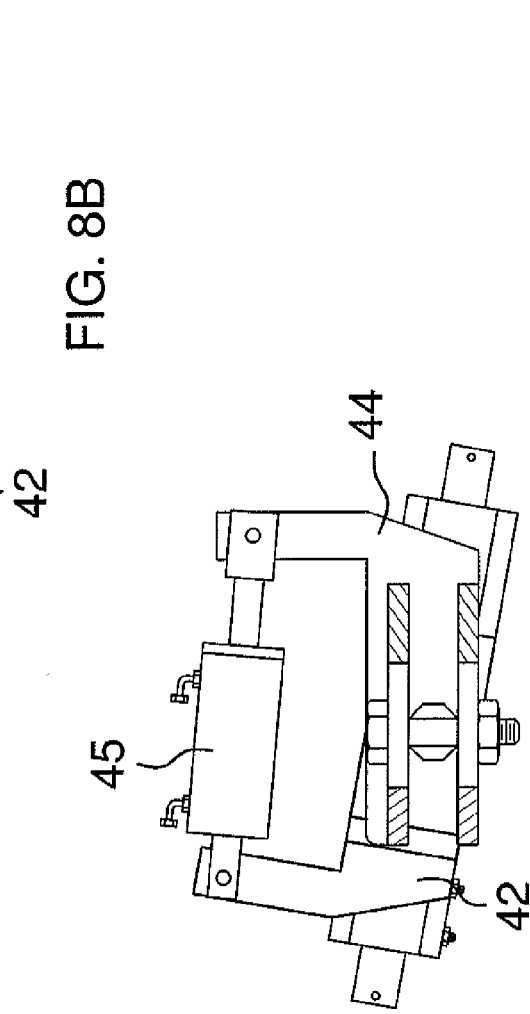
FIG. 8A
FIG. 8B
FIG. 8C

SCRAPER SYSTEM

BACKGROUND OF THE INVENTION

1. Field of the Invention

The present invention relates to box scrapers and more particularly pertains to a new box scraper for scraping and ripping a support surface.

2. Description of the Prior Art

The use of box scrapers is known in the prior art. While these devices fulfill their respective, particular objectives and requirements, the need remains for a system that has certain improved features that allows for the system to be adjusted between scraping and ripping of a support surface. Additionally, the system should also include a tongue assembly that allows the tongue assembly to be actuated to control a pitch, tilt and yaw if the system.

SUMMARY OF THE INVENTION

The present invention meets the needs presented above by generally comprising a frame being pulled behind the vehicle. The frame includes an adjustment beam slidably mounted to a front beam. A pair of mounting ends of the adjustment beam extends from opposing ends of the front beam. The frame includes a pair of side walls. Each of the mounting ends of the adjustment beam has one of the side walls coupled thereto. The adjustment beam is slid with respect to the front beam to adjust a lateral positioning of the side walls with respect to the front beam. A scraper assembly is coupled to and extends downwardly from the frame. The scraper assembly scraps the support surface to smooth out the support surface. The scraper assembly is coupled to and extends between the side walls of the frame.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 8A is a cross-sectional view of the present invention taken along line 8A-8A of FIG. 5.

FIG. 8B is the cross-sectional view of the present invention in FIG. 8A shown with the tilt adjusted to the left.

FIG. 8C is the cross-sectional view of the present invention in FIG. 8A shown with the tilt adjusted to the right.

DESCRIPTION OF THE PREFERRED EMBODIMENT

Figure 1:
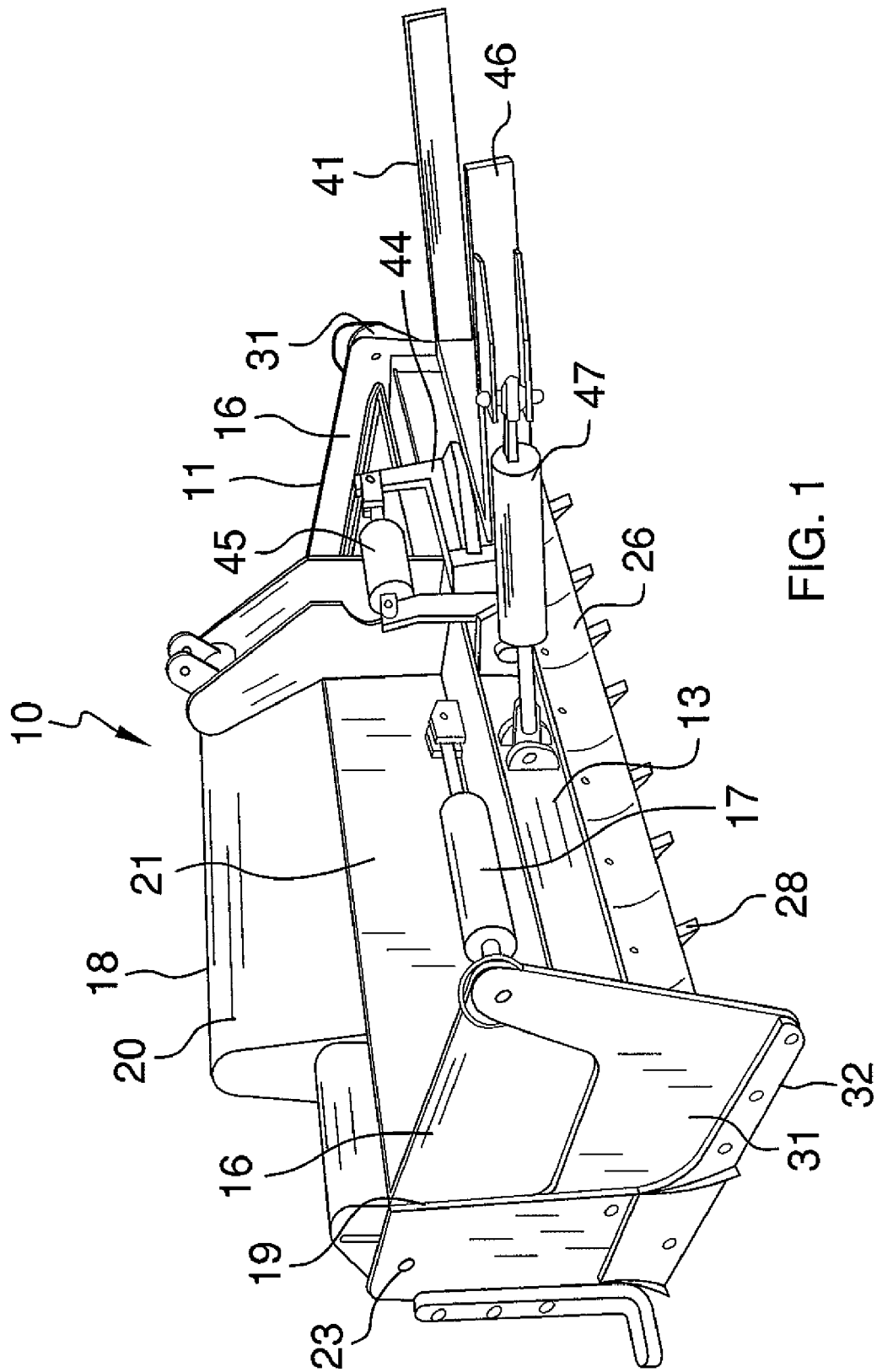
FIG. 1 is a front isometric view of a scraper system according to the present invention.
Figure 2:
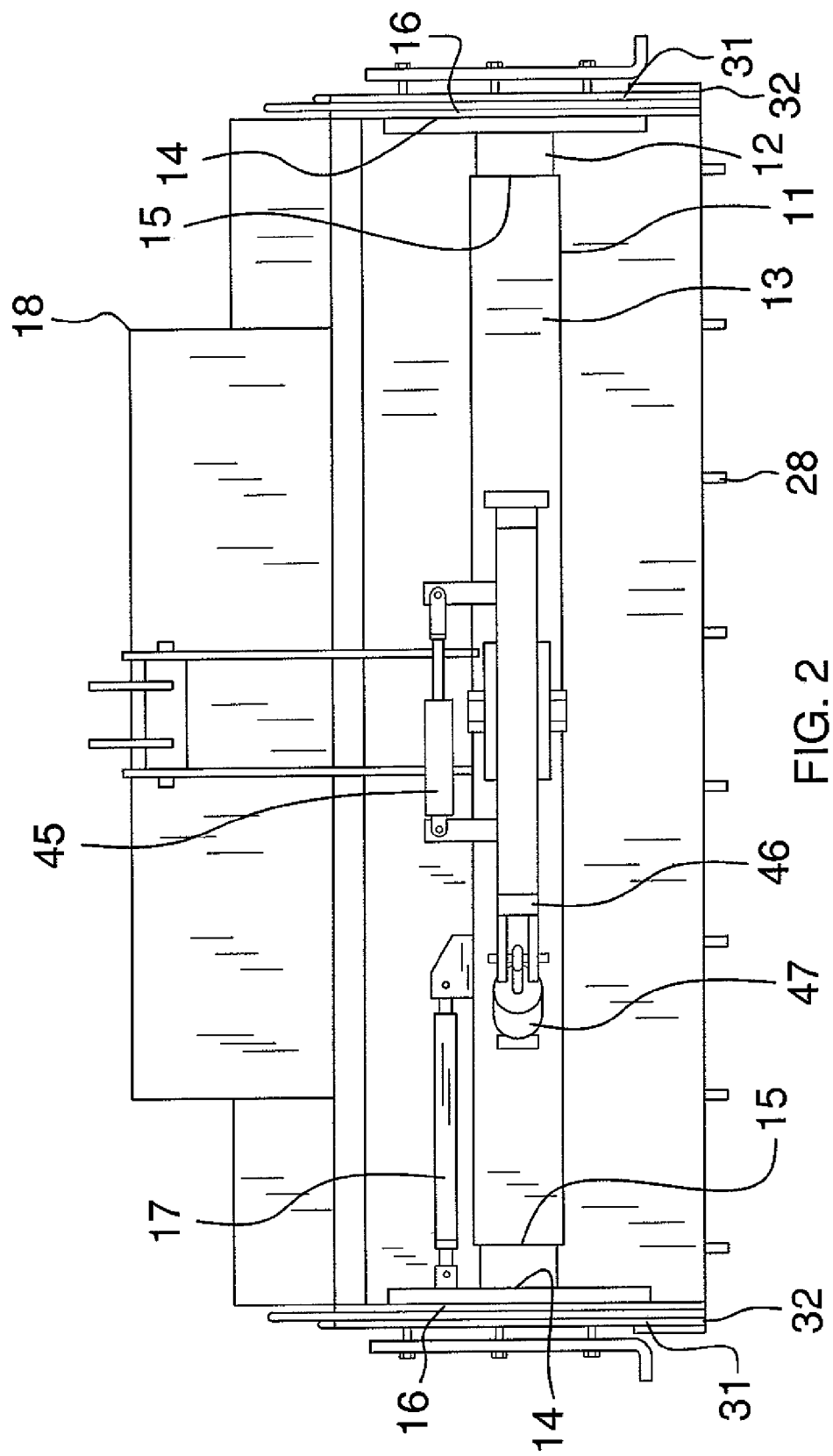
FIG. 2 is a front view of the present invention.

With reference now to the drawings, and in particular to FIGS. 1 through 11 thereof, a new box scraper embodying the principles and concepts of the present invention and generally designated by the reference numeral 10 will be described.

As best illustrated in FIGS. 1 through 11, the scraper system 10 generally comprises a frame 11 being pulled behind a vehicle 1. The frame 11 includes an adjustment beam 12 slidably mounted to a front beam 13. A pair of mounting ends 14 of the adjustment beam 12 extends from opposing ends 15 of the front beam 13. The frame 11 includes a pair of side walls 16. Each of the mounting ends 14 of the adjustment beam 12 has one of the side walls 16 coupled thereto. The adjustment beam 12 is slid with respect to the front beam 13 to adjust a lateral position of the side walls 16 with respect to the front beam 13. The frame 11 has a width of approximately 81 inches, a length of approximately 5 feet and a height of approximately 2½ feet. A lateral ram 17 is coupled to the front beam 13 and one of the side walls 16. The lateral ram 17 is actuated to adjust the lateral positioning of the side walls 16 with respect to the front beam 13.

A scraper assembly 18 is coupled to and extends downwardly from the frame 11. The scraper assembly 18 scrapes the support surface to smooth out the support surface. The scraper assembly 18 is coupled to and extends between the side walls 16 of the frame 11. The scraper assembly 18 is positioned adjacent a back edge 19 of each of the side walls 16. The scraper assembly 18 includes a housing 20 coupled to and that extends between the side walls 16 of the frame 11. The housing 20 includes a front wall 21, a back wall 22 and a peripheral wall 23 that extends between the front wall 21 and the back wall 22. A bottom edge 24 of the housing 20 defines a bottom open end 25 of the housing 20. The back wall 22 is movable away from the peripheral wall 23 to permit access into the housing 20.

The scraper assembly 18 also includes a front blade 26 mounted to the front wall 21 of the housing 20 and extends below the bottom edge 24 of the housing 20. The front blade 26 is scraped along the support surface to smooth the support surface. A rear blade 27 is mounted to the back wall 22 of the housing 20 and extends below the bottom edge 24 of the housing 20. The rear blade 27 is scraped along the support surface to smooth the support surface.

The scraper assembly 18 additionally includes a plurality of ripper teeth 28 adjustably mounted in the housing 20. The ripper teeth 28 are extendable below the bottom edge 24 of the housing 20. The ripper teeth 28 rip into the support surface to break up the support surface when the ripper teeth 28 are extended below the bottom edge 24 of the housing 20. A mounting bar 29 is slidably positioned in the housing 20 and extends across the housing 20. Each of the ripper teeth 28 are coupled to and extend downwardly from the mounting bar 29.

At least one extension ram 30 is coupled to the peripheral wall 23 and the mounting bar 29 to extend the ripper teeth 28 below the bottom edge 24 and retract the ripper teeth 28 when the at least one extension ram 30 is actuated.

Each of the side walls 16 has one of a pair of drift panels 31 rotatably coupled thereto. Each of the drift panels 31 is rotated between a raised position and a lowered position. Each of the drift panels 31 is positioned parallel to the associated one of the side walls 16. A lower edge 32 of one of the drift panels 31 is drug along the support surface to inhibit debris scraped from the support surface from passing between the scraper assembly 18 and the associated one of the drift panels 31 and forming a windrow when the associated one of the drift panels 31 is in the lowered position. The lower edge 32 of one of the drift panels 31 is raised above the support surface to allow debris scraped from the support surface to pass under the associated one of the drift panels 31 to form a windrow when the associated one of the drift panels 31 is in the raised position.

Figure 3:
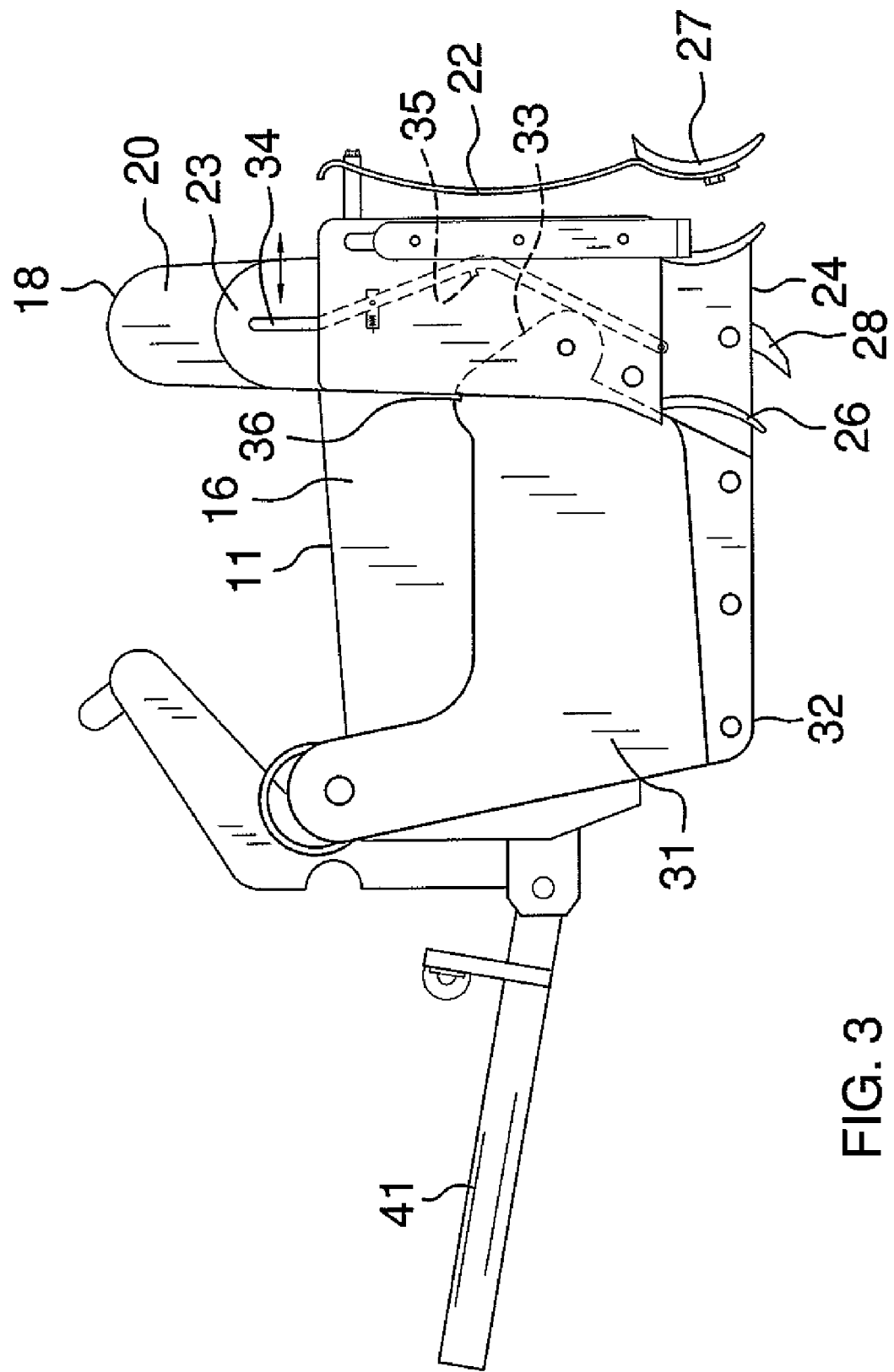
FIG. 3 is a side view of the present invention with one of the drift panel in the lowered position.
Figure 4:
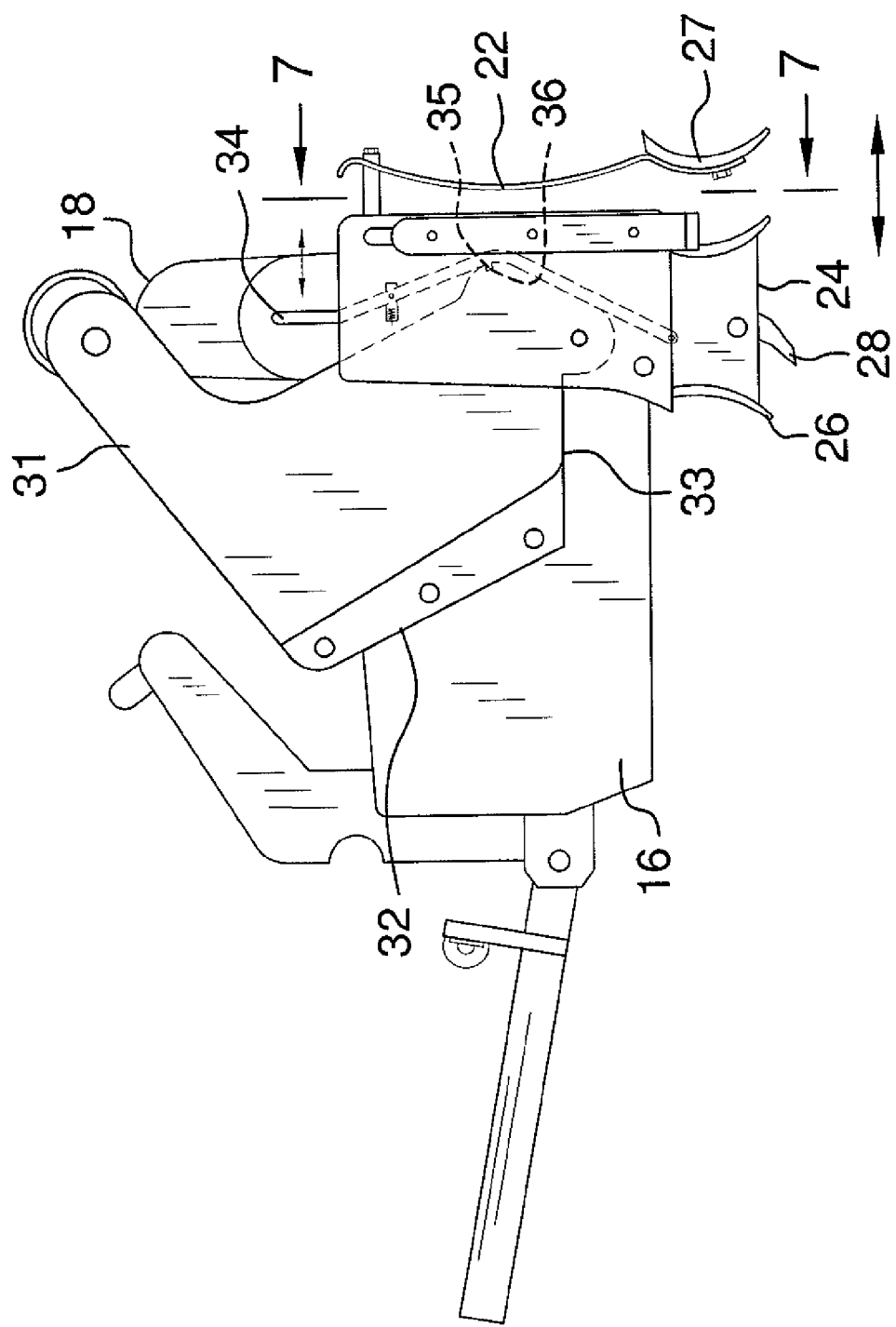
FIG. 4 is a side view of the present invention with one of the drift panels in the raised position.

As shown in FIGS. 3 and 4, each of the drift panels 31 are rotatably coupled to the side walls 16 adjacent a rear edge 33 of the associated one of the drift panels 31. Each of the side walls 16 has one of a pair of locking levers 34 rotatably coupled thereto and positioned adjacent the rear edge 33 of the associated one of the drift panels 31. As one of the drift panels 31 is rotated to the raised position the associated one of the locking levers 34 is biased against the rear edge 33 and a tooth 35 of the associated one of the locking levers 34 is inserted into a notch 36 of the drift panel 31 to secure the drift panel 31 in the raised position. The locking lever is then pulled away from the rear edge 33 of the drift panel 31 to remove the tooth 35 from the notch 36 and allow the drift panel 31 to rotate back to the lowered position.

Figure 5:
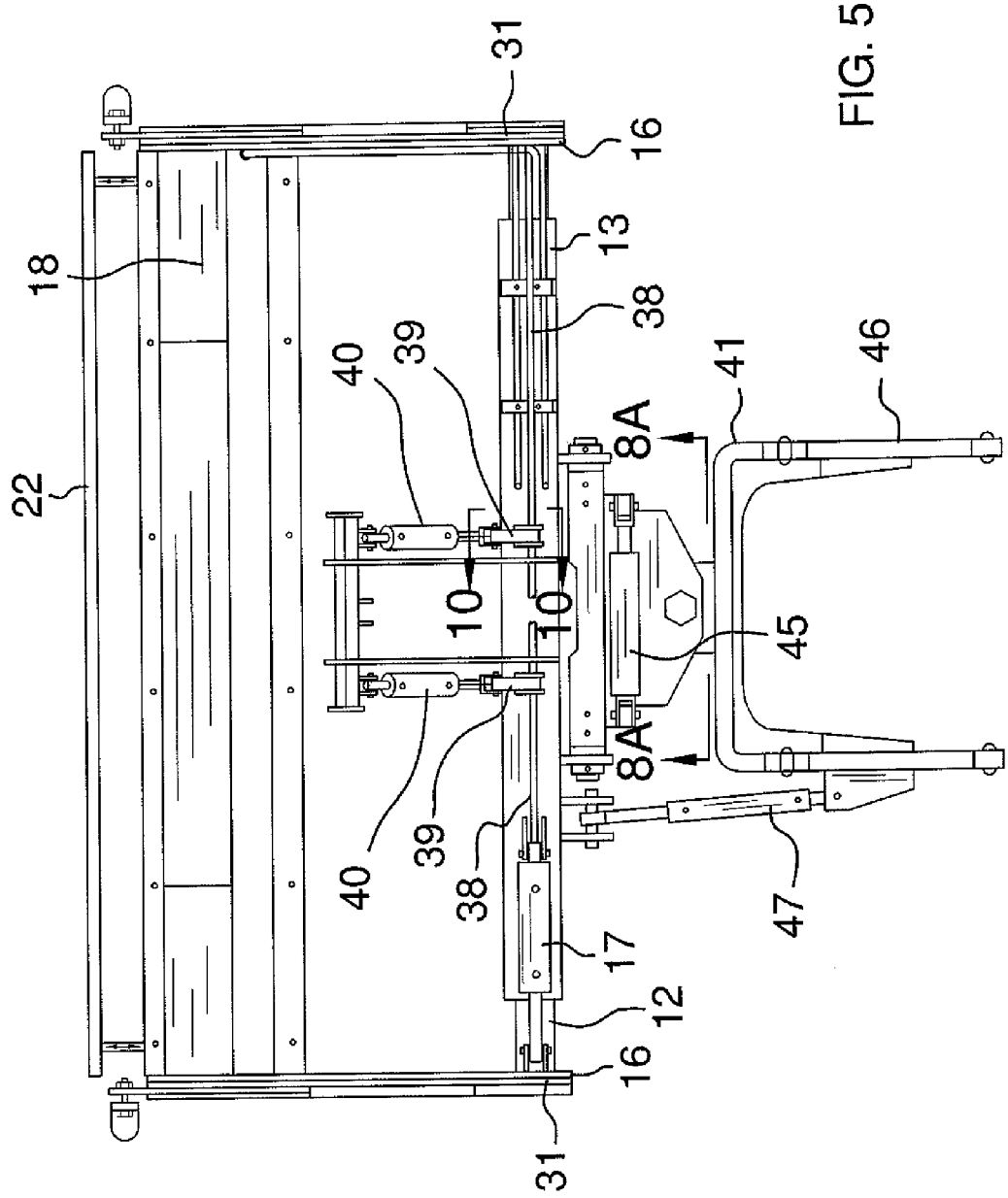
FIG. 5 is a top view of the present invention showing an embodiment of the drift panels.
Figure 6:
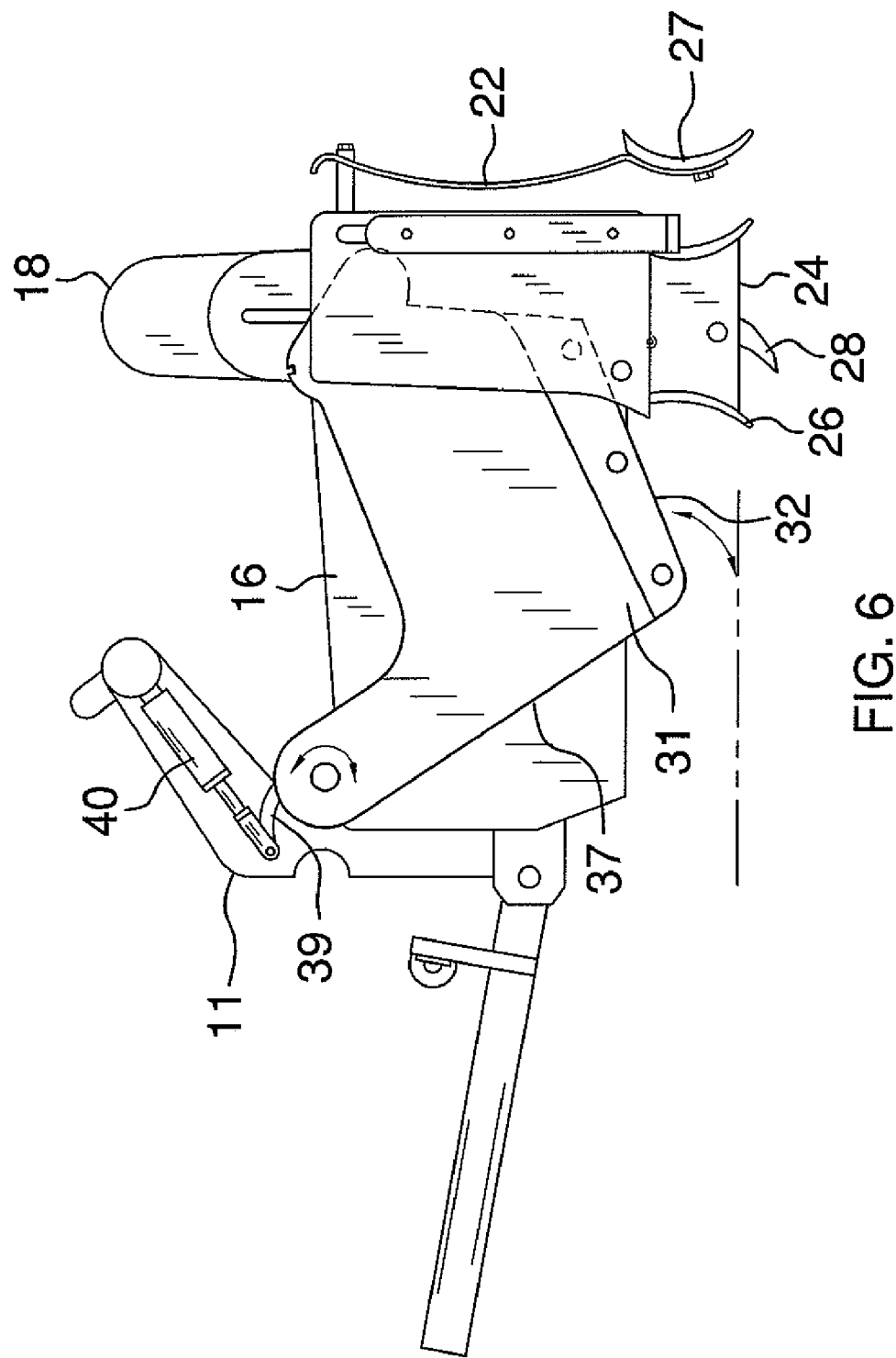
FIG. 6 is a side view of the present invention shown in FIG. 5 with one of the drift panels in the raised position.
Figure 7:
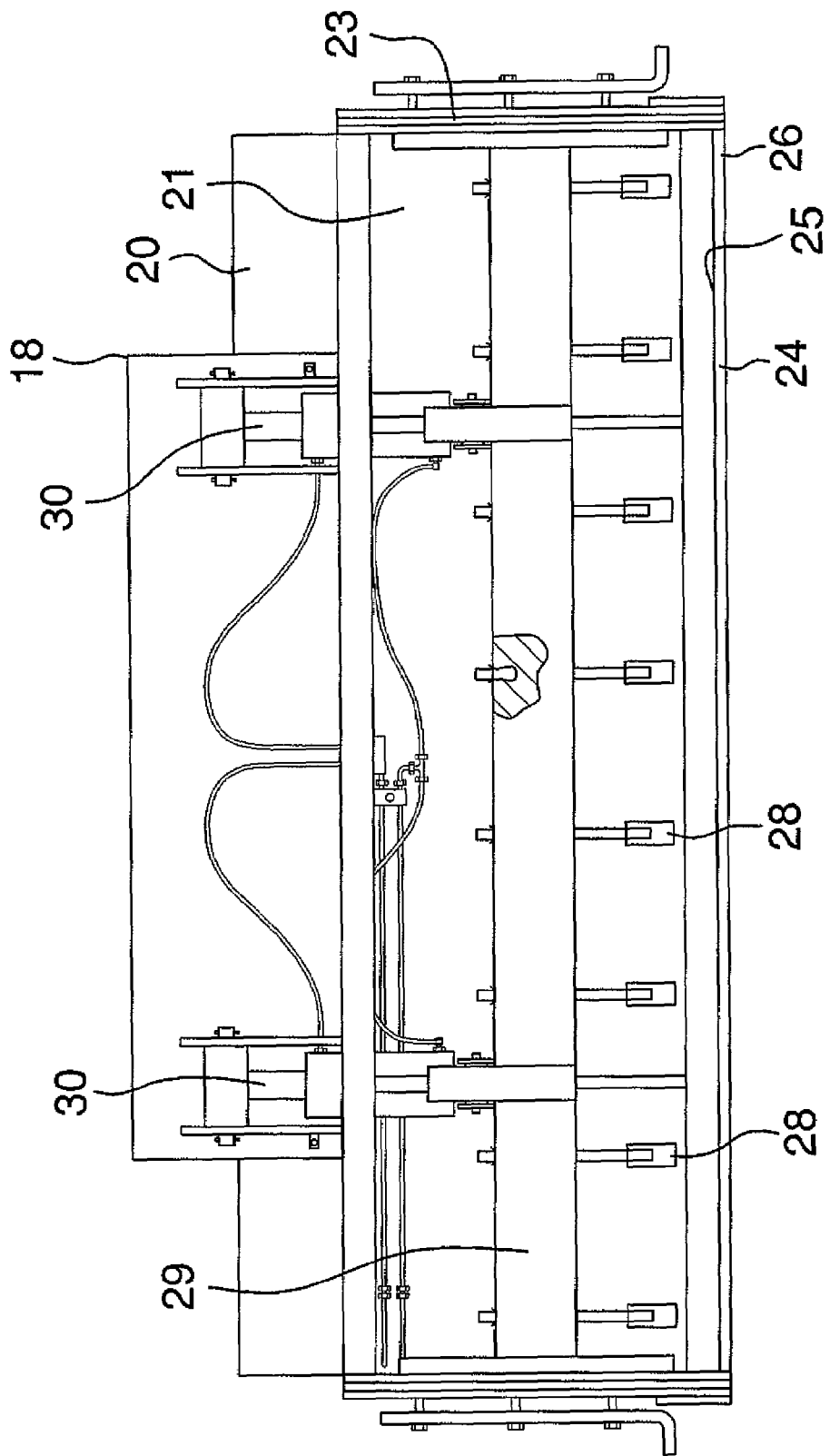
FIG. 7 is a cross-sectional view of the present invention taken along line 7-7 of FIG. 4.
Figure 10:
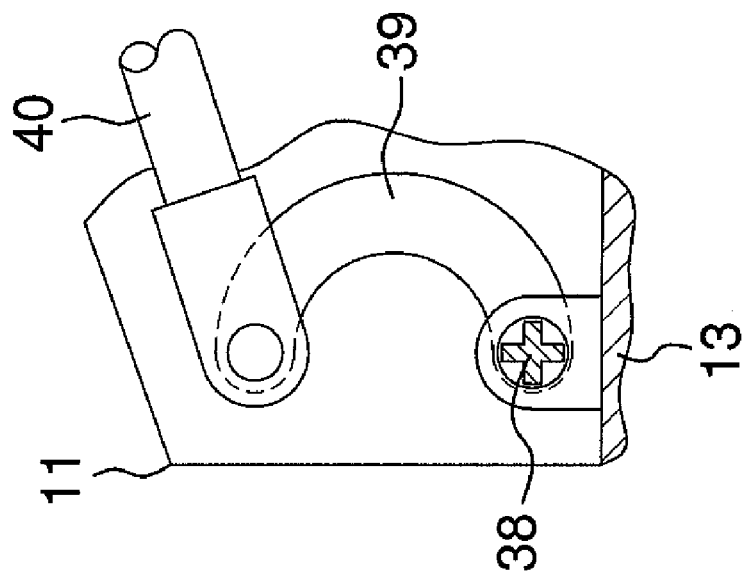
FIG. 10 is a cross-sectional view of the present invention taken along line 10-10 of FIG. 5.
Figure 9:
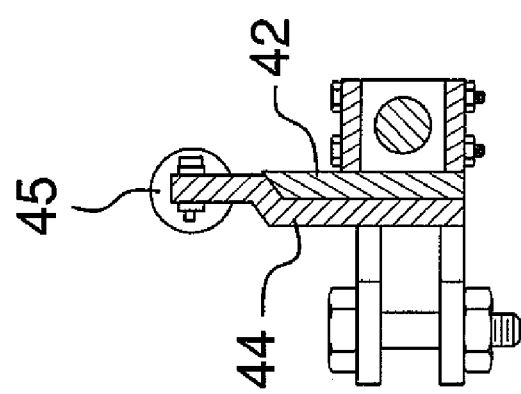
FIG. 9 is a cross-sectional view of the mounting assembly of the present invention taken along line 9-9 of FIG. 8A.
Figure 11:
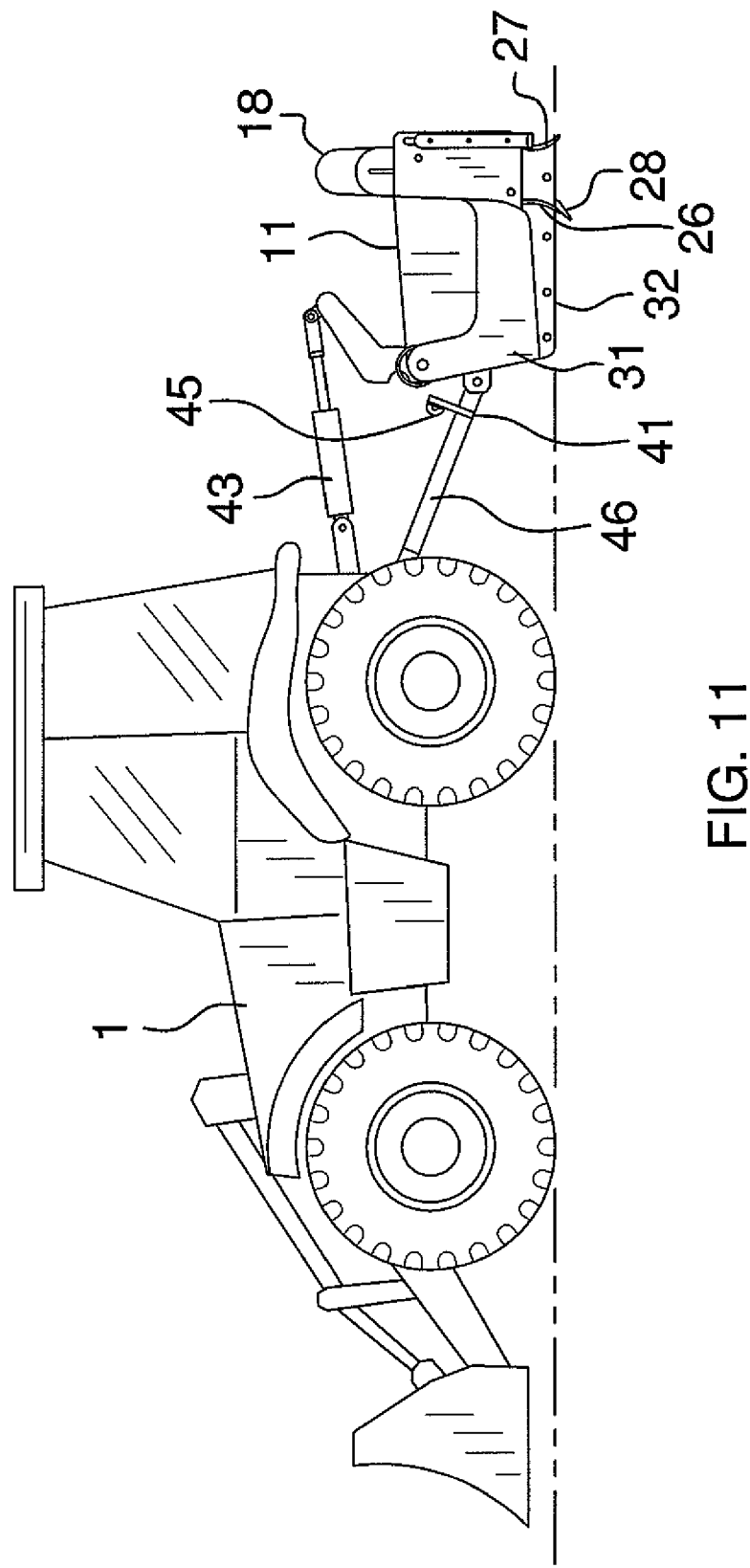
FIG. 11, is a side view of the present invention shown in use and mounted to a vehicle.

In an embodiment as shown in FIGS. 5, 6 and 10, each of the drift panels 31 are rotatably coupled to the side walls 16 adjacent a front edge 37 of the associated one of the drift panels 31. Each of the drift panels 31 has one of a pair of pivot rods 38 coupled thereto. Each of the pivot rods 38 extends through an associated one of the side walls 16 and along a portion of the front beam 13 of the frame 11. Each of the pivot rods 38 has one of a pair of pivot arms 39 slidably mounted thereto. Each of the pivot arms 39 are coupled to one of pair of pivot rams 40 that are also coupled to the frame 11. The pivot rams 40 are actuated to pivot the associated one of the pivot arms 39 which rotates the associated one of the pivot rods 38 and rotates the respective one of the drift panels 31 between the lowered position and the raised position. Each of the pivot rods 38 has a cross-shaped cross-section adjacent said pivot arm 39 to allow the associated one the pivot arms 39 to apply rotational force to the pivot rods 38 when the pivot rods 38 are slid with respect to pivot arms 39 during lateral adjustment of the side walls 16.

A tongue assembly 41 is coupled to the frame 11. The tongue assembly 41 is mounted to the vehicle 1 to permit the frame 11 and the scraper assembly 18 to be pulled behind the vehicle 1. The tongue assembly 41 is actuated to control tilt, pitch and yaw of the frame 11 and the scraper assembly 18. The tongue assembly 41 includes a rear plate 42 hingedly coupled to the frame 11. The frame 11 is pivoted with respect to the rear plate 42 to change the pitch of the frame 11 with respect to the support surface. A pitch ram 43 is coupled between the frame 11 and the vehicle 1. The pitch ram 43 is actuated to pivot the frame 11 with respect to the rear plate 42 and change the pitch of the frame 11.

The tongue assembly 41 also includes a front plate 44 rotatably coupled to the rear plate 42. The rear plate 42 is rotated with respect to the front plate 44 to change the tilt of the frame 11. A tilt ram 45 is coupled between the front plate 44 and the rear plate 42. The tilt ram 45 is actuated to rotate the rear plate 42 with respect to the front plate 44 and change a tilt of the frame 11. A yoke 46 is pivotally coupled to the front plate 44. The yoke 46 is mountable to the vehicle 1 to secure the tongue assembly 41 to the vehicle 1 when the frame 11 is to be towed. The front plate 44 is pivoted with respect to the yoke 46 to change the yaw of the frame 11. A yaw ram 47 is coupled between the yoke 46 and the frame 11. The yaw ram 47 is actuated to pivot the front plate 44 with respect to the yoke 46 to change the yaw of the frame 11.

In use, the tongue assembly 41 is mounted to the vehicle 1 to allow the scraper assembly 18 to be pulled behind the vehicle 1. The tongue assembly 41 may be actuated to allow the pitch, the tilt and the yaw of the frame 11 to be changed to produce different effects on the support surface from the scraper assembly 18 being scraped along the support surface. Also the drift panels 31 can be raised and lowered to control the formation of windrows as material is scraped from the support surface. The ripper teeth 28 can be lowered from the housing 20 of the scraper assembly 18 to rip into and break up the support surface.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A scraper system for being towed behind a vehicle to adjust a support surface, said system comprising:

a frame being pulled behind the vehicle, said frame including an adjustment beam being slidably mounted to a front beam, a pair of mounting ends of said adjustment beam extending from opposing ends of said front beam, said frame including a pair of side walls, each of said mounting ends of said adjustment beam having one of said side walls coupled thereto, said adjustment beam being slid with respect to said front beam to adjust a lateral positioning of said side walls with respect to said front beam;

a scraper assembly being coupled to and extending downwardly from said frame, said scraper assembly scraping the support surface to smooth out the support surface, said scraper assembly being coupled to and extending between said side walls of said frame; and a pair of drift panels, each of said side walls having one of said drift panels rotatably coupled thereto, each of said drift panels being rotated between a raised position and a lowered position, each of said drift panels being positioned parallel to the associated one of said side walls, said drift panels being positioned outside of said frame.

2. The system according to claim 1, further comprising a lateral ram being coupled to said front beam and one of said side walls, said lateral ram being actuated to adjust the lateral positioning of said side walls with respect to said front beam.

3. The system according to claim 1, wherein said scraper assembly is positioned adjacent a back edge of each of said side walls.

4. The system according to claim 1, wherein said scraper assembly includes a housing being coupled to and extending between said side walls of said frame, said housing including a front wall, a back wall and a peripheral wall extending between said front wall and said back wall, a bottom edge of said housing defining a bottom open end of said housing.

5. The system according to claim 4, wherein said back wall is movable away from said peripheral wall to permit access into said housing.

6. The system according to claim 4, wherein said scraper assembly includes a front blade being mounted to said front wall of said housing and extending below said bottom edge of said housing, said front blade being scraped along the support surface to smooth the support surface.

7. The system according to claim 4, wherein said scraper assembly includes a rear blade being mounted to said back wall of said housing and extending below said bottom edge of said housing, said rear blade being scraped along the support surface to smooth the support surface.

8. The system according to claim 4, wherein said scraper assembly includes a plurality of ripper teeth being adjustably mounted in said housing, said ripper teeth being extendable below said bottom edge of said housing, said ripper teeth ripping into the support surface to break up the support surface when said ripper teeth are extended below said bottom edge of said housing.

9. The system according to claim 1, wherein a lower edge of one of said drift panels is drug along the support surface to inhibit debris scraped from the support surface from passing between said scraper assembly and the associated one of said drift panels and forming a windrow when the associated one of said drift panels is in the lowered position, said lower edge of one of said drift panels being raised above the support surface to allow debris scraped from the support surface to pass under the associated one of said drift panels to form a windrow when the associated one of said drift panels is in the raised position.

10. The system according to claim 1, further comprising a tongue assembly being coupled to said frame, said tongue assembly being mounted to the vehicle to permit said frame and said scraper assembly to be pulled behind the vehicle, said tongue assembly being actuated to control tilt, pitch and yaw of said frame and said scraper assembly.

11. The system according to claim 10, wherein said tongue assembly includes a rear plate being hingedly coupled to said frame, said frame being pivoted with respect to said rear plate to change the pitch of said frame with respect to the support surface.

12. The system according to claim 11, wherein said tongue assembly includes a pitch ram being coupled between said frame and the vehicle, said pitch ram being actuated to pivot said frame with respect to said rear plate and change the pitch of said frame.

13. The system according to claim 11, wherein said tongue assembly includes a front plate being rotatably coupled to said rear plate, said rear plate being rotated with respect to said front plate to change the tilt of said frame.

14. The system according to claim 13, wherein said tongue assembly includes a tilt ram being coupled between said front plate and said rear plate, said tilt ram being actuated to rotate said rear plate with respect to said front plate and change a tilt of said frame.

15. The system according to claim 13, wherein said tongue assembly includes a yoke being pivotally coupled to said front plate, said yoke being mountable to the vehicle to secure said tongue assembly to the vehicle when said frame is to be towed, said front plate being pivoted with respect to said yoke to change the yaw of said frame.

16. The system according to claim 15, wherein said tongue assembly includes a yaw ram being coupled between said yoke and said frame, said yaw ram being actuated to pivot said front plate with respect to said yoke to change the yaw of said frame.

17. A scraper system for being towed behind a vehicle to adjust a support surface, said system comprising:

a frame being pulled behind the vehicle, said frame including an adjustment beam being slidably mounted to a front beam, a pair of mounting ends of said adjustment beam extending from opposing ends of said front beam, said frame including a pair of side walls, each of said mounting ends of said adjustment beam having one of said side walls coupled thereto, said adjustment beam being slid with respect to said front beam to adjust a lateral positioning of said side walls with respect to said front beam;

a lateral ram being coupled to said front beam and one of said side walls, said lateral ram being actuated to adjust the lateral positioning of said side walls with respect to said front beam;

a scraper assembly being coupled to and extending downwardly from said frame, said scraper assembly scraping the support surface to smooth out the support surface, said scraper assembly being coupled to and extending between said side walls of said frame, said scraper assembly being positioned adjacent a back edge of each of said side walls, said scraper assembly comprising;

a housing being coupled to and extending between said side walls of said frame, said housing including a front wall, a back wall and a peripheral wall extending between said front wall and said back wall, a bottom edge of said housing defining a bottom open end of said housing, said back wall being movable away from said peripheral wall to permit access into said housing;

a front blade being mounted to said front wall of said housing and extending below said bottom edge of said housing, said front blade being scraped along the support surface to smooth the support surface;

a rear blade being mounted to said back wall of said housing and extending below said bottom edge of said housing, said rear blade being scraped along the support surface to smooth the support surface;

a plurality of ripper teeth being adjustably mounted in said housing, said ripper teeth being extendable below said bottom edge of said housing, said ripper teeth ripping into the support surface to break up the support surface when said ripper teeth are extended below said bottom edge of said housing;

a pair of drift panels, each of said side walls having one of said drift panels rotatably coupled thereto, each of said drift panels being rotated between a raised position and a lowered position, each of said drift panels being positioned parallel to the associated one of said side walls, a lower edge of one of said drift panels being drug along the support surface to inhibit debris scraped from the support surface from passing between the scraper assembly and the associated one of said drift panels and forming a windrow when the associated one of said drift panels is in the lowered position, said lower edge of one of said drift panels being raised above the support surface to allow debris scraped from the support surface to pass under the associated one of said drift panels to form a windrow when the associated one of said drift panels is in the raised position; and a tongue assembly being coupled to said frame, said tongue assembly being mounted to the vehicle to permit said frame and said scraper assembly to be pulled behind the vehicle, said tongue assembly being actuated to control tilt, pitch and yaw of said frame and said scraper assembly.

* * * * *